Nov. 18, 1924.
O. HOGDEN
WHEEL RIM LOCK
Filed April 5, 1924
1,516,291
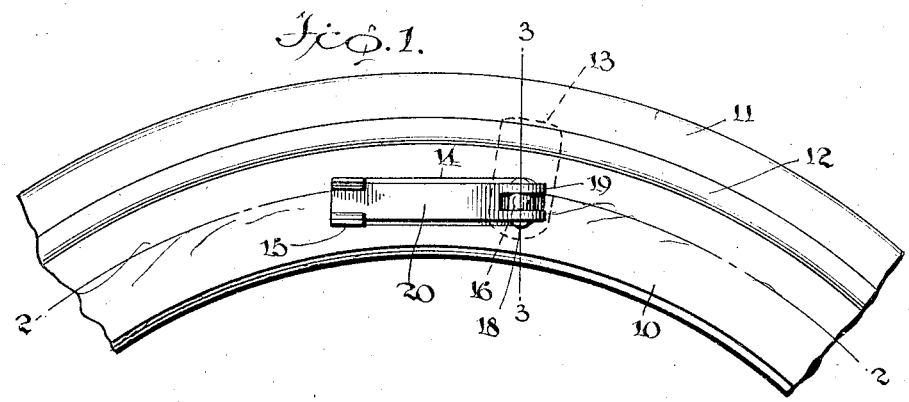
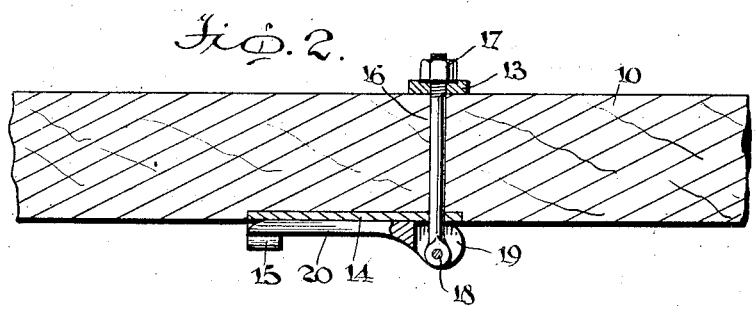
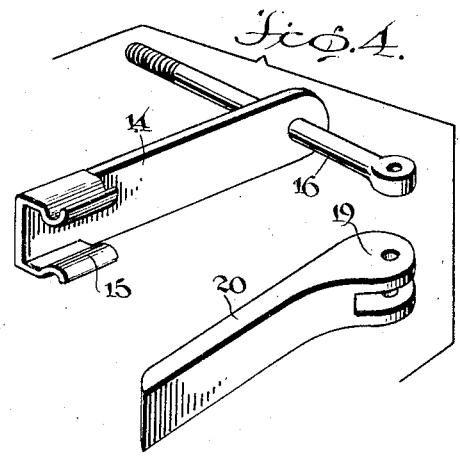
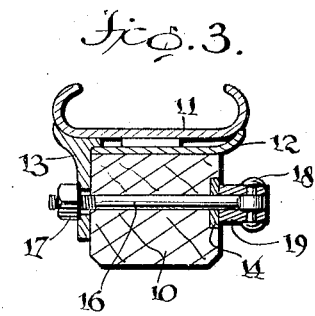
INVENTOR.
O. Hogden,
BY
*Geo. P. Kimmel*
ATTORNEY.

Patented Nov. 18, 1924.

1,516,291

UNITED STATES PATENT OFFICE.

OSCAR HOGDEN, OF ETTRICK, WISCONSIN.

WHEEL-RIM LOCK.

Application filed April 5, 1924. Serial No. 704,457.

*To all whom it may concern:*

Be it known that I, OSCAR HOGDEN, a citizen of the United States, residing at Ettrick, in the county of Trempealeau and State of Wisconsin, have invented certain new and useful Improvements in Wheel-Rim Locks, of which the following is a specification.

This invention relates to the wheels of motor driven vehicles, more particularly to the demountable rims of wheels of this class, and has for one of its objects to improve the construction and increase the efficiency and utility of devices of this character.

Another object of the invention is to provide a device of this character, which may be applied to wheels of various sizes, and shapes without material change either in the wheels or the attachments.

With these and other objects in view the invention consists in certain novel features of construction as hereinafter shown and described and then specifically pointed out in the claim, and in the drawings illustrative of the preferred embodiment of the invention—

Figure 1 is a view of a part of a wheel felloe, a part of the wheel rim, with the device applied.

Figure 2 is a section on the line 2—2 of Figure 1.

Figure 3 is a transverse section on the line 3—3 of Figure 1.

Figure 4 represents the parts of the improved device in perspective and disassembled.

The improved device is adapted to be applied to the felloe portion of the wheel of an auto driven vehicle, to hold the demountable rim in place and to enable the latter to be quickly applied to or removed from the felloe. A portion of a felloe is represented at 10, a portion of the demountable rim at 11, a portion of the annular ribbed support at 12, and one of the holding clips at 13, these parts being of the usual construction.

There are generally from four to twelve of the clips and the holding devices on each wheel, depending on the weight and size of the vehicle.

Embedded in the face of the felloe 10 opposite each of the clips 13 is a combined wear plate 14 and spring friction catches the catches being represented at 15.

Operating through the felloe 10 each of the clips 13 and each of the plates 14, is a clamp bolt 16 threaded at one end to receive an adjusting nut 17, and apertured at the other end beyond the plate 14 to receive a relatively large pin 18. Mounted to swing on the pin 18 is the forked end of a cam 19 the latter having an operating lever arm 20 adapted to engage the spring catch 15 when the arm is in one position. By this simple arrangement it will be obvious, that longitudinal strain may be applied by the cams to each of the clamp bolts 16, to hold the clips 13 firmly compressed against the rim 11, and the amount of the compression effectually controlled by adjusting the nuts 17.

The grip of the cams will be retained by the coaction of the arms 20 and the catches 15, the latter possessing sufficient resistance to prevent accidental displacement of the arm, while at the same time releasable by abnormal force applied thereto.

The embedded plates 14 receive the wear and friction of the cam 19 and arm 20, and thus prevent wear being imparted to the relatively soft material of the felloe.

The improved device enables the rim to be firmly retained in place upon the felloe, and adapted to be quickly removed or replaced by merely releasing the series of cams 19, and without the necessity for detaching a series of nuts or like fastening devices.

The improved device is simple in construction, can be inexpensively manufactured and applied.

Having thus described the invention, what is claimed as new is:

In a device of the class described, an apertured wear member bearing against one face of a wheel body and carrying yieldable catch elements, a clamp bolt extending through the aperture of the wear plate and through the wheel body, a clip device bearing against the opposite face of the wheel body and adapted to engage against a wheel rim, a cam device rotatively engaging the bolt and operative against the wear member, and an operating arm extending from the cam device and engaging the resilient catch elements of the wear member.

In testimony whereof, I affix my signature hereto.

OSCAR HOGDEN.